United States Patent
Horiuchi et al.

(10) Patent No.: US 8,052,207 B2
(45) Date of Patent: Nov. 8, 2011

(54) INTERLOCKING MECHANISM OF SUNSHADE PANEL IN A SUNROOF DEVICE

(75) Inventors: Shigehito Horiuchi, Sakura (JP); Takashi Kato, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 0 days.

(21) Appl. No.: 12/823,601

(22) Filed: Jun. 25, 2010

(65) Prior Publication Data

US 2010/0327632 A1    Dec. 30, 2010

(30) Foreign Application Priority Data

Jun. 26, 2009  (JP) ................ 2009-151693

(51) Int. Cl.
*B60J 7/00*      (2006.01)
(52) U.S. Cl. ............................................ 296/214
(58) Field of Classification Search .................. 296/214
See application file for complete search history.

(56) References Cited

U.S. PATENT DOCUMENTS

| | | | |
|---|---|---|---|
| 6,485,090 B1 * | 11/2002 | Patz et al. | 296/214 |
| 6,880,884 B2 * | 4/2005 | Sugiura | 296/216.08 |
| 6,923,501 B2 * | 8/2005 | Sugiura | 296/214 |
| 7,798,567 B2 * | 9/2010 | Glasl et al. | 296/214 |

FOREIGN PATENT DOCUMENTS

| | | |
|---|---|---|
| JP | 4-11121 | 1/1992 |
| JP | 06-247147 | 9/1994 |
| JP | 08-310247 | 11/1996 |
| JP | 08-318739 | 12/1996 |
| JP | 2007-176240 | 7/2007 |

\* cited by examiner

*Primary Examiner* — Dennis Pedder
(74) *Attorney, Agent, or Firm* — Rankin, Hill & Clark LLP

(57) ABSTRACT

An object of the present invention is to provide an interlocking mechanism of panels of a guide rail for roof panel and a guide rail for sunshade panel even in a case where both guide rails are mutually different in curvature. The interlocking mechanism enables the sunshade panel to move independently in an opening direction in either case of opening and closing of the roof panel, and prevent the sunshade panel from moving independently in a closing direction relative to the roof panel. The interlocking mechanism comprises an engaging member provided in the roof panel and an engaged member provided in the sunshade panel to engage with the engaging member. The engaging member and the engaged member are constituted to engage with each other in an upper-and-lower direction such that a relative position thereof varies according to a change of positional deviation between the first guide rail and the second guide rail.

9 Claims, 8 Drawing Sheets

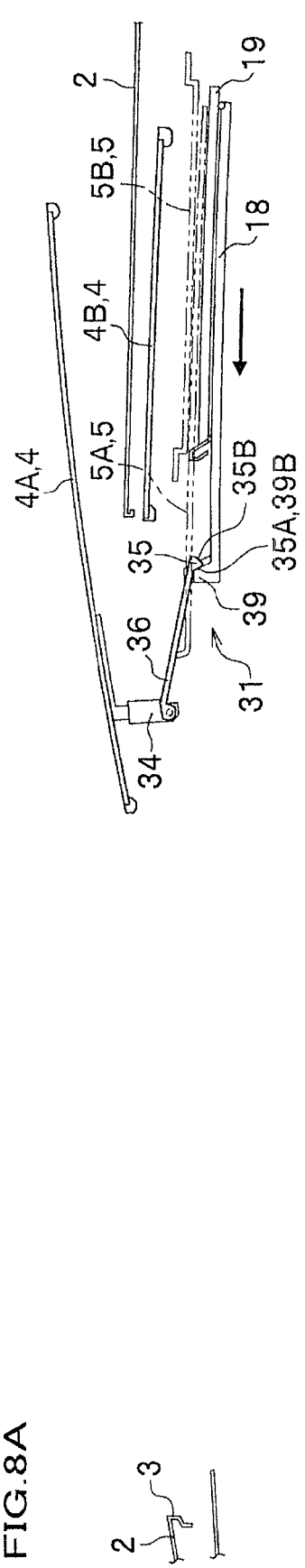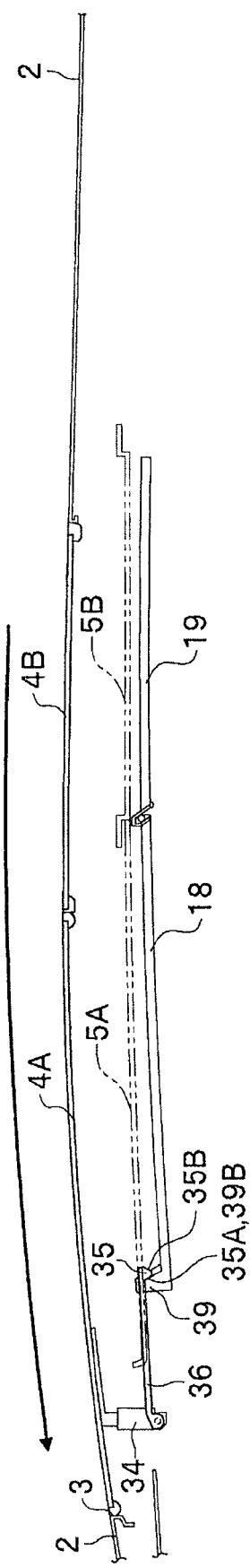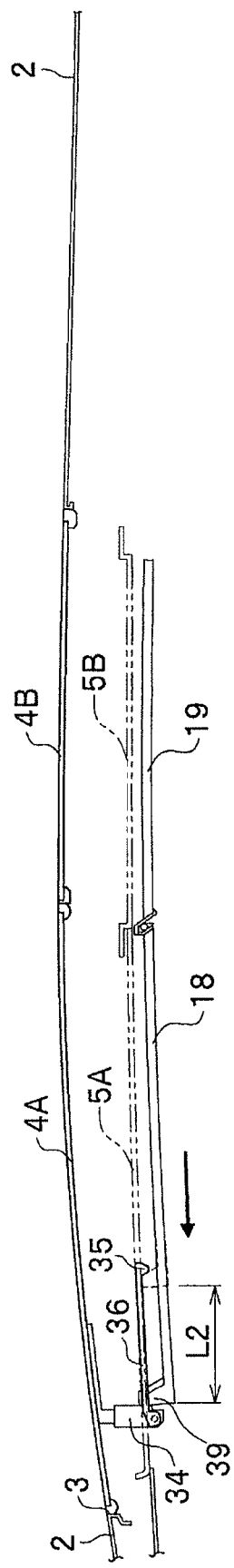

INTERLOCKING MECHANISM OF SUNSHADE PANEL IN A SUNROOF DEVICE

TECHNICAL FIELD

The present invention relates to a sunroof device of a vehicle.

BACKGROUND ART

Conventionally, as this kind of device, the sunroof device has been known or disclosed, for example, in Japanese Patent Publication No. 3,315,179 (hereinafter, referred to as a literature) (paragraph [0024]), which is designed to enable an opening or closing of a sunshade panel to operate by mechanically interlocking to an opening or closing of the roof panel and to enable an opening or closing of the sunshade panel to operate manually.

An interlocking means (an engaging member 19 of the panel side and an engaging member 20 of the sunshade side in the above literature) has been described in the above literature. The interlocking means is designed to move for opening or closing the sunshade panel manually and independently at the time of full closing condition of the roof panel, and to move the sunshade panel in an opening direction by interlocking to the roof panel at the time of moving the roof panel in an opening direction.

SUMMARY OF THE INVENTION

In general, a fixed roof of a vehicle is formed by a curved surface. As the roof panel is designed to be opened or closed along the curved surface, a guide rail for guiding an opening or closing of the roof panel is also likely to be machined in bending in a vehicle front-and-rear direction in harmony with the curved surface of the fixed roof. Most of vehicle compartment ceilings are also constituted by a curved surface. Most of guide rails for guiding an opening or closing of the sunshade panels are machined in bending in a vehicle front-and-rear direction in harmony with a curved surface of the vehicle compartment ceilings.

In a case where curvatures of curved surfaces of the fixed roof and the vehicle compartment ceiling are almost the same, it is possible to have a function of guide rails for both panels in a guide rail member as a constitution shown in FIG. 4 of the above literature. That is, it is possible to set the same value in curvatures (curvatures around an axis in a vehicle width direction) of guide rails of the both panels. It may be, however, a case where curvatures of guide rails must be mutually changed depending on a difference of curvatures between curved surfaces of the fixed roof and the vehicle compartment ceiling. In this case, it is difficult to machine in different bending as for a guide rail having different curvatures. Then, a guide rail for roof panel and a guide rail for sunshade panel are ordinarily provided as different members, respectively.

When a guide rail for roof panel is different in curvature from a guide rail for sunshade panel, it is naturally constituted to gradually change a positional deviation of heights between the both guide rails in a vehicle front-and-rear direction. When the interlocking means constituted by an engaging member of panel side and an engaging member of sunshade side described in the above literature are applied to such a rail constitution, it may be difficult to maintain a function of engagement, while absorbing a change of positional deviation of heights between the guide rails, as both engaging members are constituted to be engaged in a lateral direction, more specifically, to be engaged to have an engaging allowance in a vehicle width direction.

Under these circumstances to solve the above problems, an object of the present invention is to provide an interlocking mechanism of sunshade panel in a sunroof device, by which a function of interlocking of both panels can be easily maintained, even in a case where a guide rail for roof panel and a guide rail for sunshade panel are mutually different in curvature, respectively.

In order to solve the above problem, the present invention is characterized by the following matters. That is, the present invention includes a sunroof device having a roof panel and a sunshade panel opening or closing an opening provided in a fixed roof of a vehicle in a front-and-rear direction of a vehicle, a first guide rail guiding an opening or closing of the roof panel through the roof panel slider connected to a lower surface of a side edge of the roof panel, a second guide rail guiding an opening or closing of the sunshade panel through a sunshade panel slider provided in a side edge of the sunshade panel. In the above sunroof device, the present invention includes an interlocking mechanism enabling the sunshade panel to open or close by mechanically interlocking to the opening or closing of the roof panel in case of a mechanical interlocking, and enabling the sunshade panel to move independently in an opening direction in spite of an opening or closing condition of the roof panel and preventing the sunshade panel to move independently relative to the roof panel in a closing direction in case of the opening or closing of the sunshade panel by manual operation. Furthermore, the interlocking mechanism includes an engaging member provided in the roof panel, and an engaged member provided in the sunshade panel to engage with the engaging member. Still furthermore, the engaging member and the engaged member are constituted to engage each other in an upper and lower direction such that a relative position thereof varies according to a change of positional deviation between the first guide rail and the second guide rail.

According to a constitution of the above interlocking mechanism, a relative position between the engaging member and the engaged member changes according to a change of positional deviations of heights between the first guide rail and the second guide rail. Accordingly, the interlocking mechanism of the sunshade panel to the roof panels can be easily maintained, even if both curvatures of the guide rails are mutually different.

The present invention is characterized in that the engaging member comprises a first engaging member fixed to the roof panel, and a second engaging member provided rotatably around an axis along a vehicle width direction relative to the roof panel and having a claw protruding in a lower side. Further, the claw locates at a vehicle rear portion of the first engaging member, and the engaged member is constituted by a first engaged member and a second engaged member protruding on an upper surface of the sunshade panel slider. Furthermore, the first engaging member presses the first engaged member to move the sunshade panel in an opening direction at the time of opening the roof panel, and the claw of the second engaging member is engaged with a rear surface of the second engaged member to move the sunshade panel in a closing direction at the time of closing the roof panel. Still furthermore, the sunshade panel continues to move independently in an opening direction, on the ground that the rear surface of the second engaged member presses the claw to move the second engaging member upwards at the time of manually operating the sunshade panel in an opening direction, and the sunshade panel continues to move independently in an closing direction, on the ground that a front surface of the second engaged member presses the claw to move the second engaging member upwards at the time of manually operating the sunshade panel in a closing direction, thus to prevent the sunshade panel from moving independently furthermore on the ground that the first engaged member is in contact with the first engaging member.

In this constitution, an economical sunroof device can be obtained by that the interlocking mechanism has a small number of pieces or parts and is excellent in a simple constitution and in an assembling.

According to the present invention, an interlocking function of sunshade panel to the roof panels can be easily maintained, even in a case where the guide rail for roof panel and the guide rail for sunshade panel are mutually different in curvatures.

A BRIEF DESCRIPTION OF THE DRAWINGS

FIG. 2A is a side view around a front roof panel, and FIG. 2B is a side view around a rear roof panel.

FIGS. 5A and 5B are a closing condition and an opening condition of the roof panel, respectively.

FIG. 8 is a side view showing a function of the interlocking mechanism at the time of closing the roof panel.

BEST MODE FOR CARRYING OUT THE INVENTION

Figure 1:
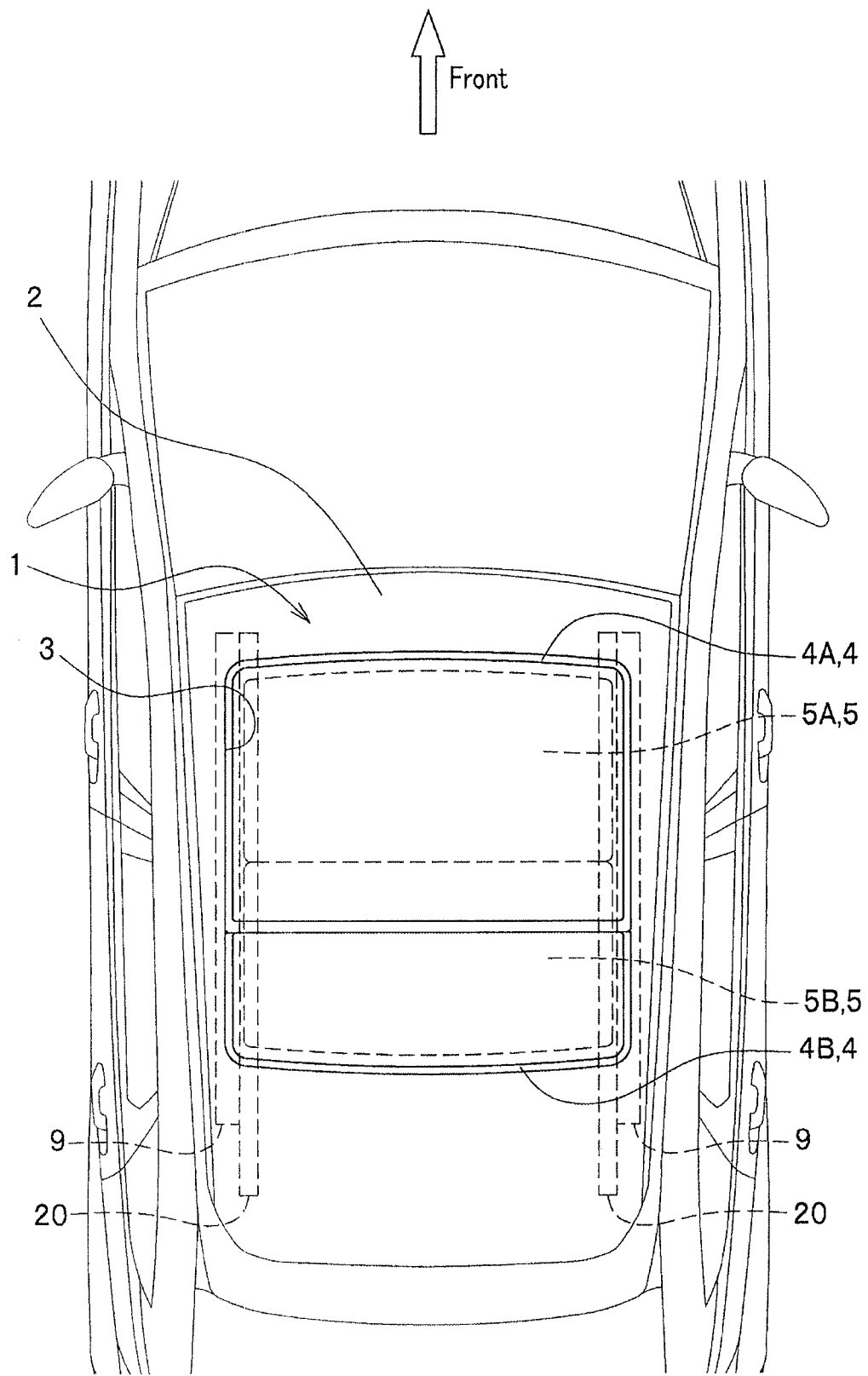
FIG. 1 is a plan view of the sunroof device relating to the present invention.

Hereinafter, a sunroof device with a roof panel and a sunshade panel divided into a lot of pieces in a vehicle front-and-rear direction will be respectively described as an example. As shown in FIG. 1, the sunroof device 1 is provided with a front roof panel 4A and a rear roof panel 4B as a roof panel 4 for opening or closing an opening 3 provided in a fixed roof 2, and a front sunshade panel 5A and a rear sunshade panel 5B as a sunshade panel 5 placing under the above roof panel 4.

A fundamental constitution around the roof panel 4 will be described. In FIG. 2, the front roof panel 4A is designed to open by moving rearwards in a tilt-up condition by shifting in a front-and-rear direction of a roof panel slider (first roof panel slider 6), which positions in the front side, and a roof panel slider (second roof panel slider 7), which positions in the rear side, connected to a lower surface of both side edges thereof to open a roof panel. The rear roof panel 4B is designed to open by moving rearwards in a tilt-down condition by shifting in a front-and-rear direction of the roof panel slider (third roof panel slider 8) connected to a lower surface of both side edges thereof to close a roof panel. The front roof panel 4A and the rear roof panel 4B are, for example, made of glass.

Figure 2A:
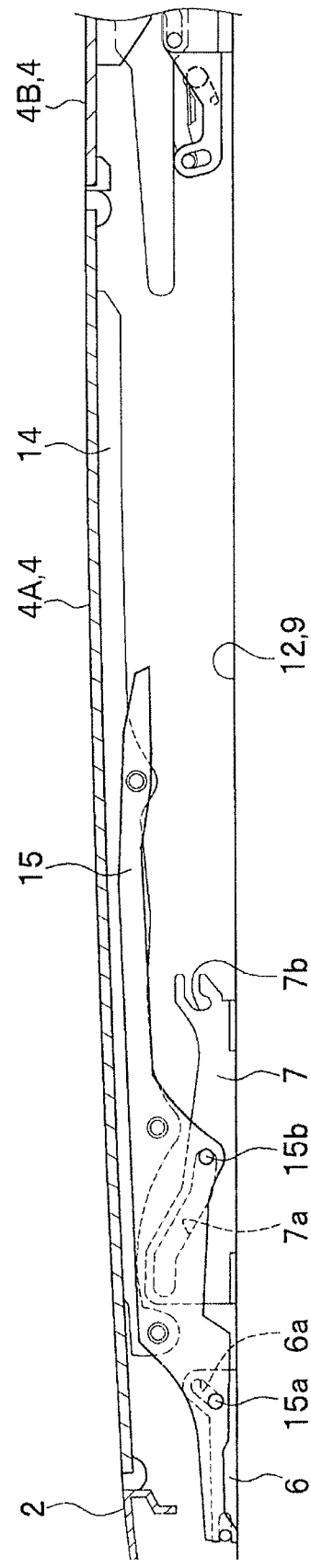
FIGS. 2A and 2B are side views around the roof panel.
Figure 2B:
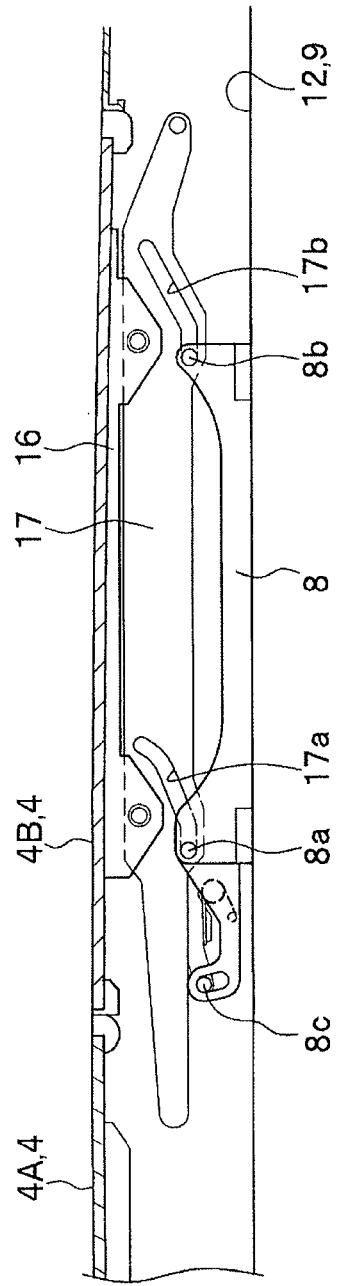
Figure 4:
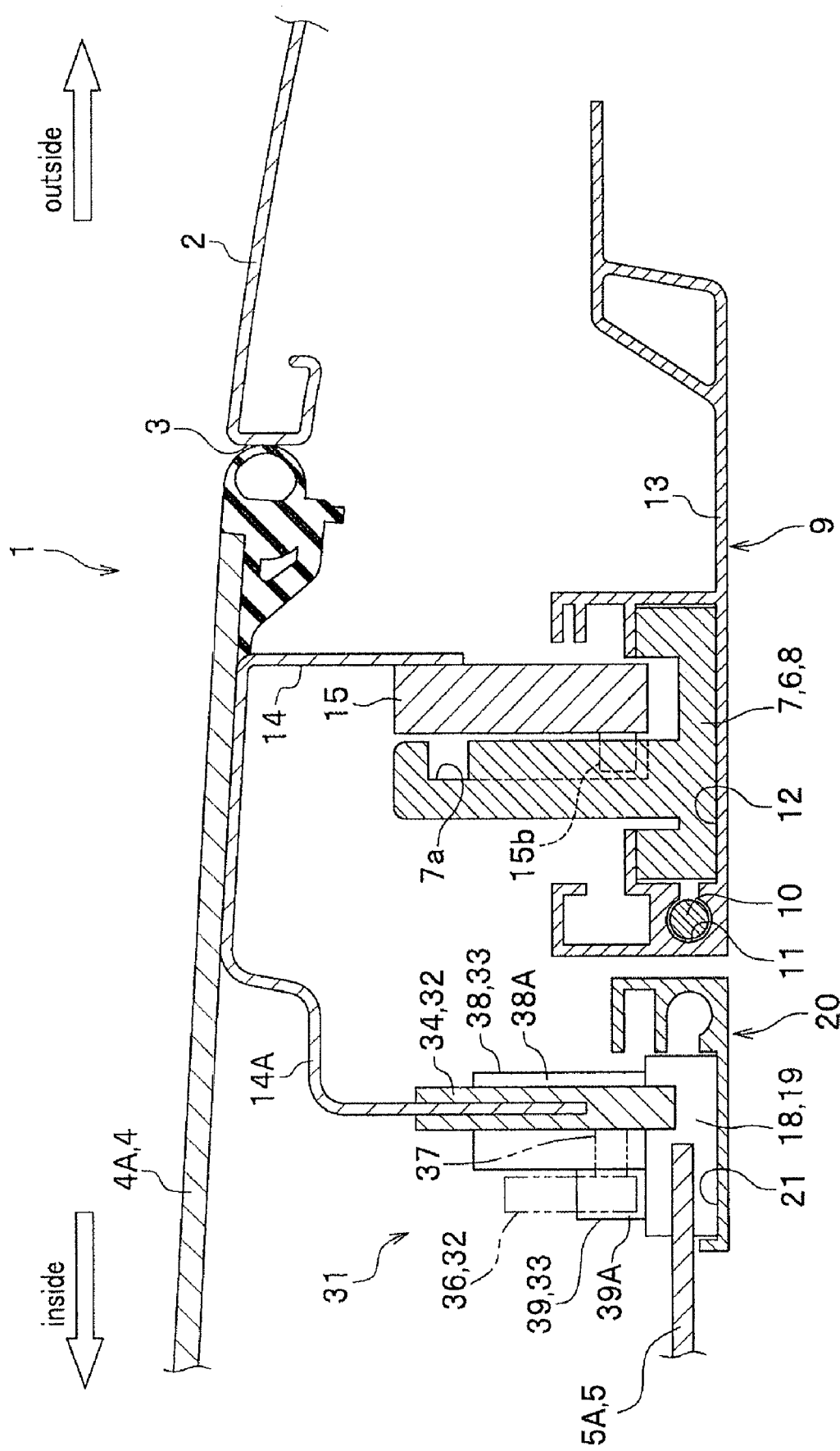
FIG. 4 is a sectional view of the first guide rail and the second guide rail as seen from a vehicle front-and-rear direction.

In FIG. 1 a pair of left and right first guide frames 9 extending in a vehicle front-and-rear direction are respectively mounted in the lower side of both side edges of the opening 3. As shown in FIG. 4, the first guide frame 9 is formed like a sectional form having a cable groove 11 for inserting a push-pull cable 10 moving in a front-and-rear direction by a driving motor as not shown, a first guide rail 12 guiding the slide of the first, second, and third roof panel sliders 6, 7, 8, and a drainage groove 13 for draining rainwater or the like. Thus, it is constituted by an extrusion member, for example, made of aluminum alloy. The second roof panel slider 7 is connected to the push-pull cable 10 to function as a driving slider. As shown in FIG. 2A, a lower surface of the front roof panel 4A is provided with a support stay 15 of panel through a support bracket 14. The first roof panel slider 6 and the second roof panel slider 7 are respectively provided with cam grooves 6a, 7a. The support stay 15 of panel is formed to protrude cam pins 15a, 15b engaging with the cam grooves 6a, 7a. On the other hand, as shown in FIG. 2B, a lower surface of the rear roof panel 4B is provided with a support stay 17 of panel through a support bracket 16. The support stay 17 of panel is provided with a pair of cam grooves 17a, 17b, and the front and rear portions of the third roof panel slider 8 are respectively provided with cam pins 8a, 8b engaging with the cam grooves 17a, 17b. A rear end of the second roof panel slider 7 is provided with an engaging groove 7b, and a front end of the third roof panel slider 8 is provided with a movable engaging pin 8c for switching an attachment or a detachment to the engaging groove 7b. A detailed description of a mechanism of attachment and detachment by a combination of the engaging groove 7b and the engaging pin 8c will not be described owing to departing far from a spirit or gist of the present invention.

Figure 3A:
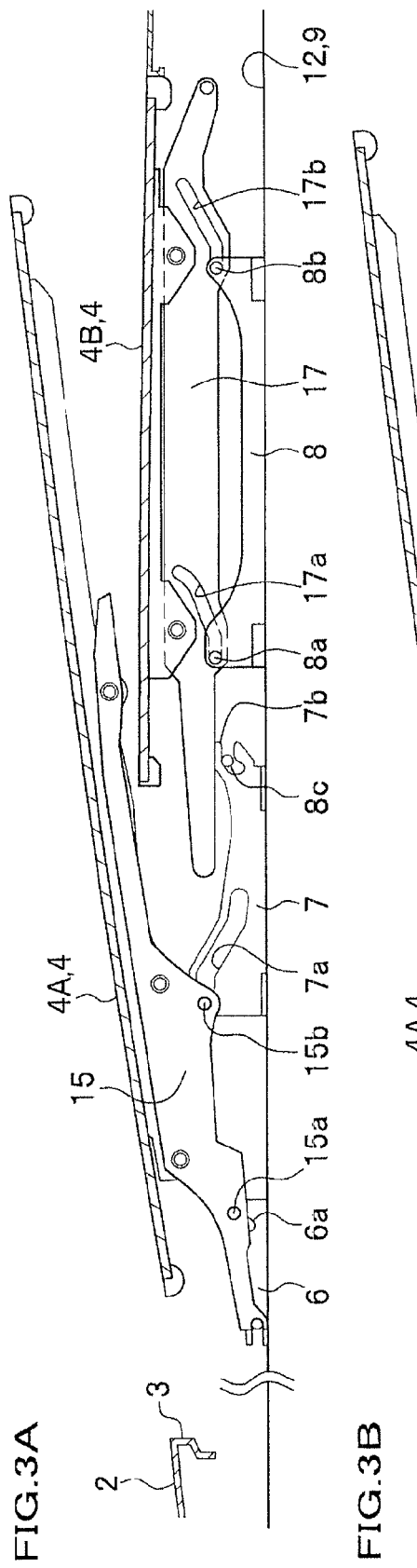
FIG. 3 is an explanatory view of opening or closing of the roof panel.

An opening or closing action of the front roof panel 4A and the rear roof panel 4B will be described with reference to FIG. 3. When the second roof panel 7 moves a little rearwards from both of the roof panels 4A and 4B with a full opening condition through the push-pull cable 10 (FIG. 4), the cam pins 15a, 15b are designed to move inside the cam grooves 6a, 7a, respectively, thus to tilt up the front roof panel 4A. Further, when the second roof panel slider 7 moves rearwards, the first roof panel slider 6 also moves through the support stay 15 of panel, and then the front roof panel 4A slides rearwards in a tilt-up condition. As a result, the engaging pin 8c and the engaging groove 7b come to be engaged as shown in FIG. 3A, when the moving stroke reaches a predetermined value.

Figure 3B:
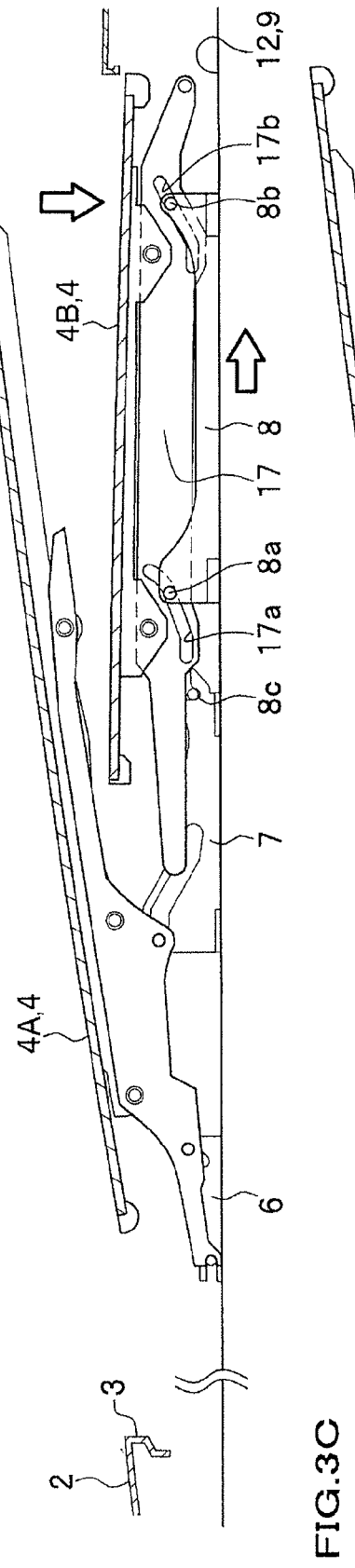
Figure 3C:
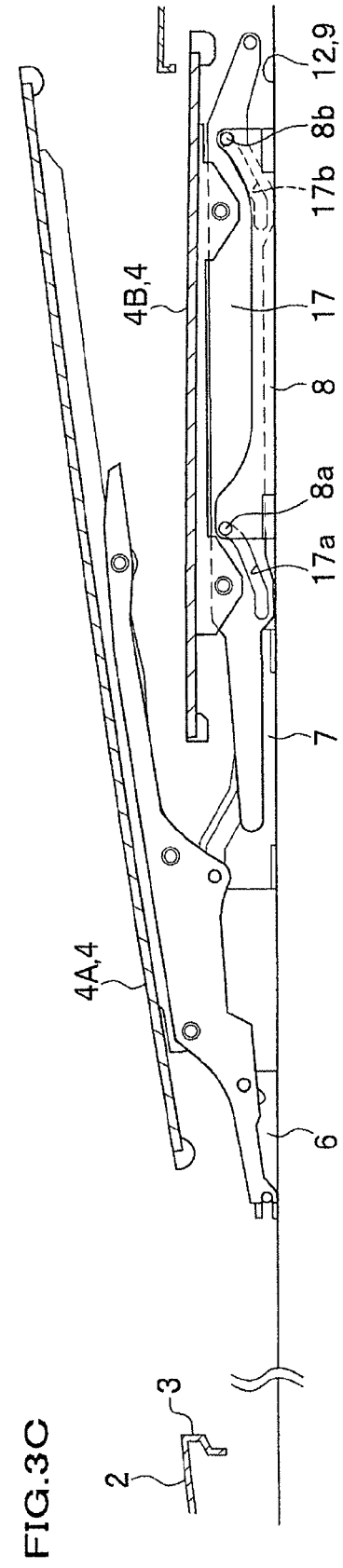

When the second roof panel slider 7 moves still further rearwards, the third roof panel slider 8 also moves rearwards through the mechanism of attachment and detachment of the engaging groove 7b and the engaging pin 8c, thus to move the cam pins 8a, 8b inside the cam grooves 17a, 17b, respectively. As a result, the rear roof panel 4B tilts down as shown in FIG. 3B. Thereafter, as shown in FIG. 3C, the front roof panel 4A and the rear roof panel 4B gradually open rearwards as one in a tilt-up condition and a tilt-down condition, respectively. In addition, as a closing action is a reverse action of the above opening action, the description will be omitted.

Next, when a fundamental constitution around the sunshade panel 5 will be described, side edges of the front sunshade panel 5A and the rear sunshade panel 5B are respectively provided with the first sunshade panel slider 18 and the second sunshade panel slider 19. The first sunshade panel slider 18 and the second sunshade panel slider 19 are designed to slide inside the second guide rail 21 of the second guide frame 20 provided in a vehicle inner side of the first guide frame 9 as shown in FIG. 4. The second guide frame 20 is constituted by an extrusion member, for example, made of aluminum alloy as well as the first guide frame 9. An opening or closing action interlocking between the front sunshade panel 5A and the rear sunshade panel 5B is performed by the interlocking mechanism provided in the first sunshade panel slider 18 and the second sunshade panel slider 19. As the above interlocking mechanism, a well-known mechanism such as the interlocking mechanism 10 described in Japanese Unexamined Laid-open publication No. 176,240 of 2007 may be applied. The detailed description will be omitted, as it departs far from a spirit or gist of the present invention.

Figure 5A:
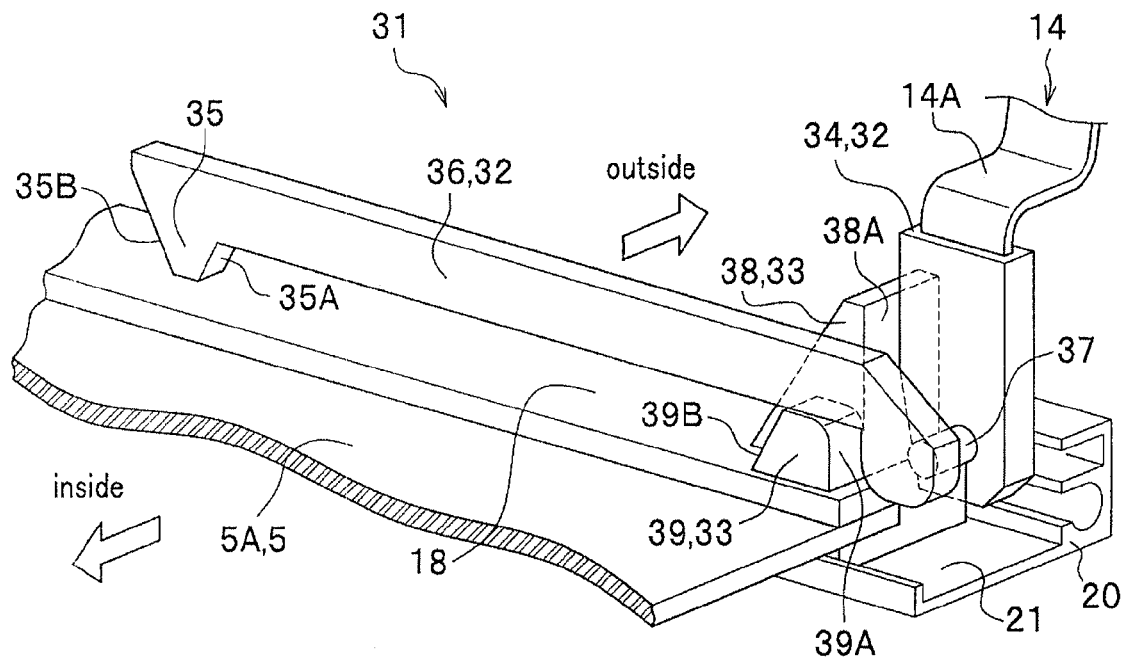
FIGS. 5A and 5B are perspective views of an appearance of the interlocking mechanism relating to the present invention.
Figure 5B:
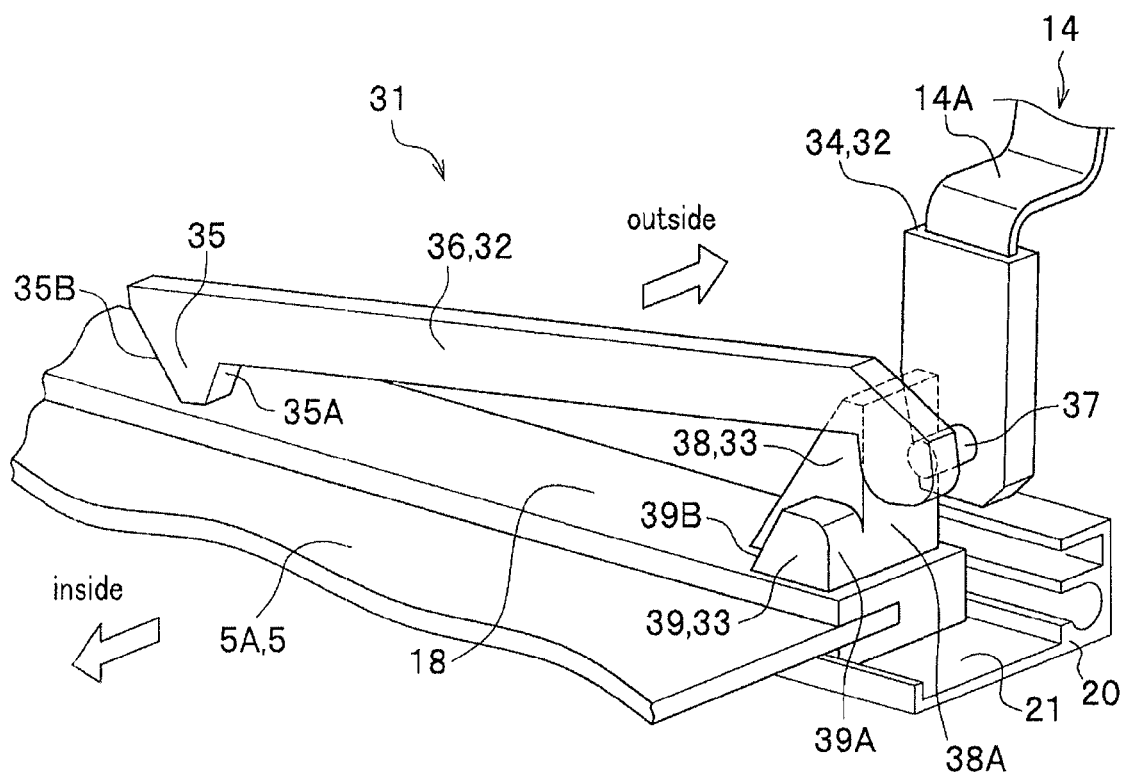

In the above constitution, the sunroof device 1 relating to the present invention is designed to open or close the sunshade panel 5 by a mechanism interlocking mechanically with opening or closing of the roof panel 4. Then, in a manual opening or closing of the sunshade panel 5, the sunroof device 1 is provided with an interlocking mechanism 31 to enable an independent movement concerning an opening direction in spite of an opening or closing condition of the roof panel 4, and to prevent an independent movement to the roof panel 4 concerning a closing direction. In principal, with reference to FIG. 4 and FIG. 5, the interlocking mechanism 31 includes an engaging member 32 provided in the roof panel 4, and an engaged member 33 provided in the sunshade panel 5 to engage with the engaging member 32. The engaging member 32 and the engaged member 33 are constituted to engage in an upper-and-lower direction such that its relative position varies according to a change of positional deviations in height between the first guide rail 12 and the second guide rail 22. This interlocking mechanism 31 is provided between the front roof panel 4A and the front sunshade panel 5A.

More specifically, the engaging member 32 is provided with a first engaging member 34 fixed to the front roof panel 4A, and a second engaging member 36 provided rotatably around an axis along a vehicle width direction relative to the front roof panel 4A to have a claw 35 extending to a lower side. The claw 35 positions in a vehicle rear side of the first engaging member 34. The front end side of the support bracket 14 as shown in FIG. 2 is locally provided with a mounting portion for engaging member 14A extending to an upper side of the second guide rail 21 as shown in FIG. 4 and FIG. 5. The first engaging member 34 is fixed to a lower end of the mounting portion for engaging member 14A.

As shown in FIG. 5, the first engaging member 34 is constituted by, for example, a block piece made of resin, which is thin and long in vehicle width direction. The first engaging member 34 is mounted to a tip of the mounting portion for engaging member 14A by a method such as press in. Depending on a case, it may be constituted by fixing the first engaging member 34 to the front roof panel 4A through the other exclusive member in place of the support bracket 14, and may be constituted by directly fixing the first engaging member 34 to the front roof panel 4A. A portion surrounding a tip of the mounting portion for engaging member 14A of the support bracket 14 may be designed to function as the first engaging member 34.

A side surface placed in an inner side of vehicle width direction of the first engaging member 34 is provided with a rotation axis 37 along a vehicle width direction. A front end of the second engaging member 36 is rotatably connected around the rotation axis 37. The second engaging member 36 is made from a long plate member extending in a vehicle front-and-rear direction, regarding a vehicle width direction as a thick-wall direction, and a lower portion of rear end thereof is provided with the claw 35 having a front oblique surface 35A facing to a front and lower oblique direction and a rear oblique surface 35B facing to a rear and lower oblique direction. In this embodiment, a rear end of the second engaging member 36 is considered as a free edge.

The engaged member 33 is constituted by a first engaged member 38 and a second engaged member 39 extending on an upper surface around a front end of the first sunshade panel slider 18. The first engaged member 38 is provided with a vertical engaging surface 38A facing to a vehicle front side, and this engaging surface 38A is in contact with a rear edge of the first engaging member 34.

Figure 7A:
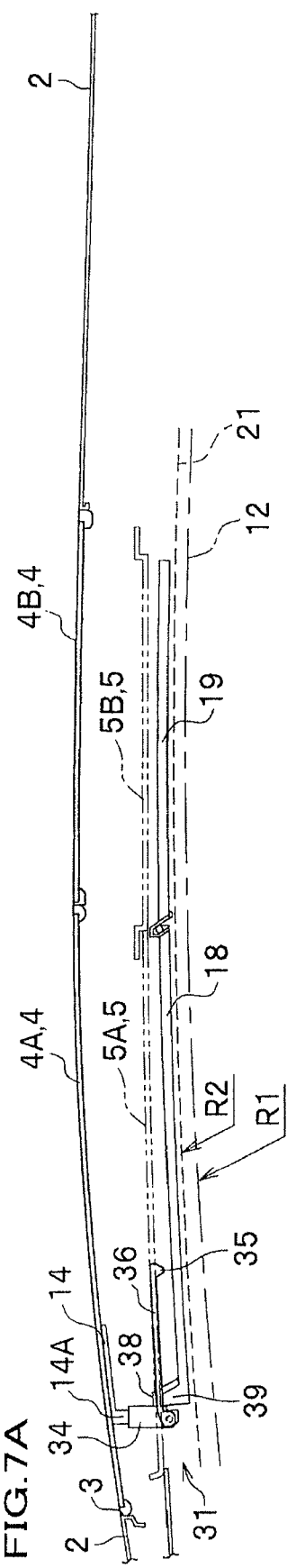
FIG. 7 is a side view showing a function of the interlocking mechanism at the time of opening the roof panel.

On the other hand, the second engaged member 39 is provided with a vertical front surface 39A facing to a vehicle front side and processed in a curving surface, and an oblique engaging surface 39B facing to a rear and upper oblique side and engaging with a front oblique surface 35A of the claw 35 of the second engaging member 36. Hereinafter, a function of the interlocking mechanism 31 will be described mainly with reference to FIG. 7 and FIG. 8. The front sunshade panel 5A and the rear sunshade panel 5B are formed like an arc swelling toward upwards as to a vehicle width direction. A position as shown by imaginary lines in FIG. 7 and FIG. 8 is set to be a height as seen in section at the center in a vehicle width direction. A full closing condition of both a side of the roof panel 4 and a side of the sunshade panel 5 is shown in FIG. 7A. In this condition, the interlocking mechanism 31 is in a condition shown in FIG. 5A, and a rear edge of the first engaging member 34 is in contact with the engaging surface 38A of the first engaged member 38. As the front roof panel 4A is closed, the first engaging member 34 shifts in a lower side, and the first engaging member 34 and the first engaged member 38 are mutually engaged in an upper-and-lower direction with a large engaging allowance. A front end side of the second engaging member 36 is in a condition placed on an upper portion of the second engaged member 39.

(A Function at the Time of Opening the Roof Panel 4)

As described in FIG. 3, the front roof panel 4A tilts up at first, when it is opened from a full closed condition. In this time, the interlocking mechanism 31 is in a condition shown in FIG. 5B, and the first engaging member 34 moves upwards in order to tilt up the front roof panel 4A. Then, although the engaging allowance in an upper-and-lower direction relative to the first engaged member 38 becomes small, the both maintain an engaged relationship. Thus, when the front roof panel 4A moves rearwards in a tilt-up condition, the front sunshade panel 5A and the rear sunshade panel 5B move toward an opening direction caused by pressing the first engaged member 38 (engaging surface 38A).

When the front roof panel 4A reaches a predetermined position, the rear roof panel 4B tilts down as described in FIG. 3. Thereafter, the front roof panel 4A and the rear roof panel 4B move rearwards as one in tilt-up and tilt-down conditions, respectively. The rear sunshade panel 5B moves upwards in a storing portion formed between the fixed roof 2 and the vehicle compartment ceiling to store the front sunshade panel 5A in a lower side of the rear sunshade panel 5B.

Figure 7B:
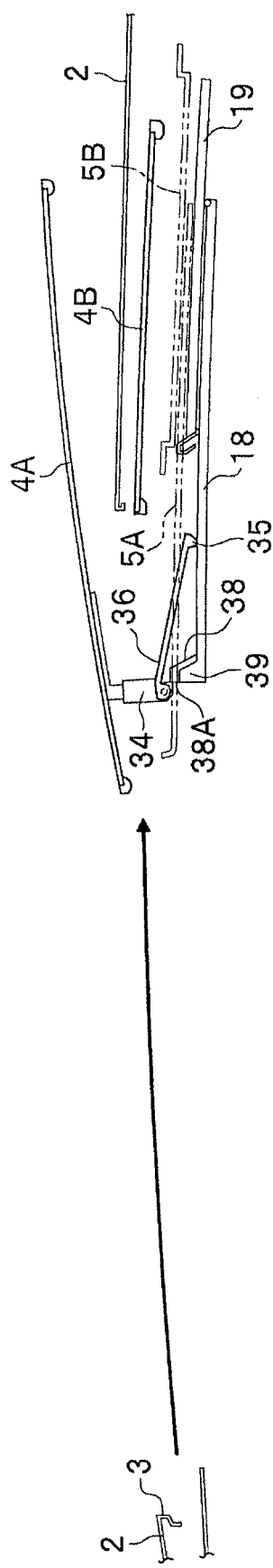

In FIG. 7B, full opening conditions of the front roof panel 4A and the rear roof panel 4B are shown. The first engaging member 34 and the first engaged member 38 are maintained in a condition shown in FIG. 5B, during an opening action from FIG. 7A to FIG. 7B. In this condition, in a case where a curvature R1 of the first guide rail 12 for roof panel 4 and a curvature R2 of the second guide rail 21 for sunshade panel 5 are different each other based on a difference of curvatures of the fixed roof 2 and the vehicle compartment ceiling, it is gradually increasing in a positional deviation of heights in a vehicle front-and-rear direction between both of these guide rails. In this matter, the present invention is so constituted that an engaged condition between the both can be maintained by an upper and lower variation of the engaging allowance based on the positional deviation, that is, a variation of the relative positions of the first engaging member 34 to the first engaged member 38, as the first engaging member 34 and the first engaged member 38 are mutually engaged in an upper-and-lower direction.

Figure 7C:
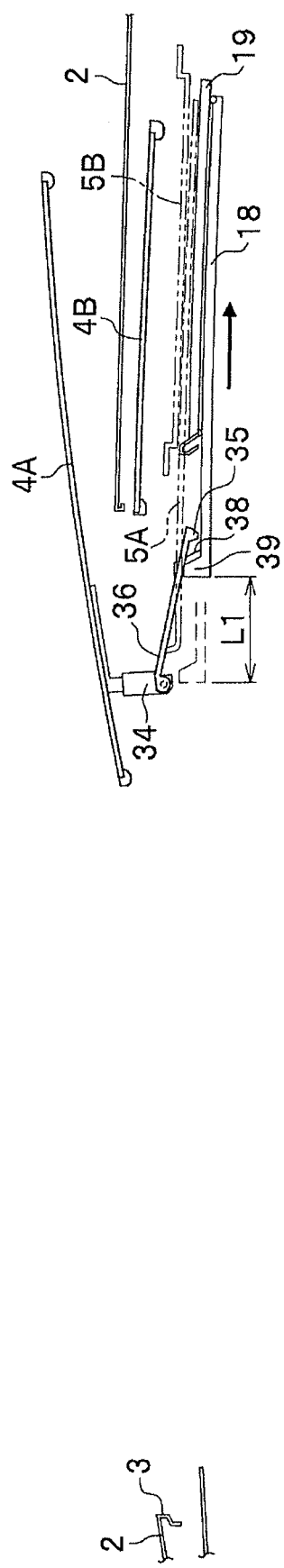

In this embodiment, it is designed to manually open the front sunshade panel 5A by a movement of distance L1 as shown in FIG. 7C from a condition in FIG. 7B. This distance L1 is a distance, in which the second engaged member 39 does not move beyond the claw 35 of the second engaging member 36. Naturally, a position of the front sunshade panel 5A shown in FIG. 7B may be arranged to be in a full opening position.

(A Function at the Time of Closing the Roof Panel 4)

When the front roof panel 4A moves forwards from a condition in FIG. 7C, the claw 35 of the second engaging member 36 is engaged (clutched) with a rear surface of the second engaged member 39 as shown in FIG. 8A. More specifically, the front oblique surface 35A of the claw 35 of the second engaging member 36 is engaged with an oblique engaging surface 39B of the second engaged member 39. Thus, this condition is maintained, until the front roof panel 4A and the rear roof panel 4B shown in FIG. 8B become a full closing condition. As a result, the front sunshade panel 5A and the rear sunshade panel 5B are mutually interlocked to move in a closing direction. Even in a case where a positional deviation of heights between the first guide rail 12 and the second guide rail 21 is gradually varied during a process from FIG. 8A to FIG. 8B, the claw 35 of the second engaging member 36 and the second engaged member 39 are mutually engaged in an upper-and-lower direction. Then, an engaged condition between the both is maintained by rotating the second engaging member 36 around a rotational axis according to the positional deviation, that is, by variation of relative positions of the second engaging member 36 relative to the second engaged member 39.

As a result, the front sunshade panel 5A and the rear sunshade panel 5B result in being a full closing condition by manually closing the front sunshade panel 5A by a distance L2 shown in FIG. 8C from a condition in FIG. 8B.

(At the Time of Manually Operating in an Opening Direction of the Sunshade Panel 5)

Figure 6A:
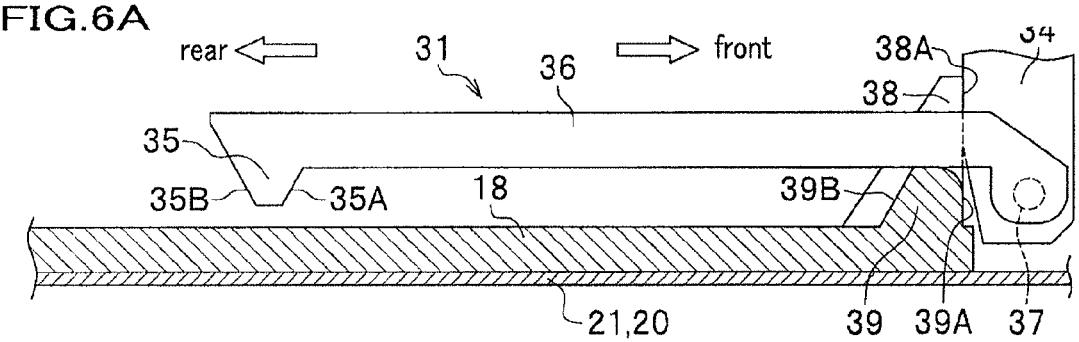
FIG. 6 is a side view showing a function of the interlocking mechanism relating to the present invention.
Figure 6B:
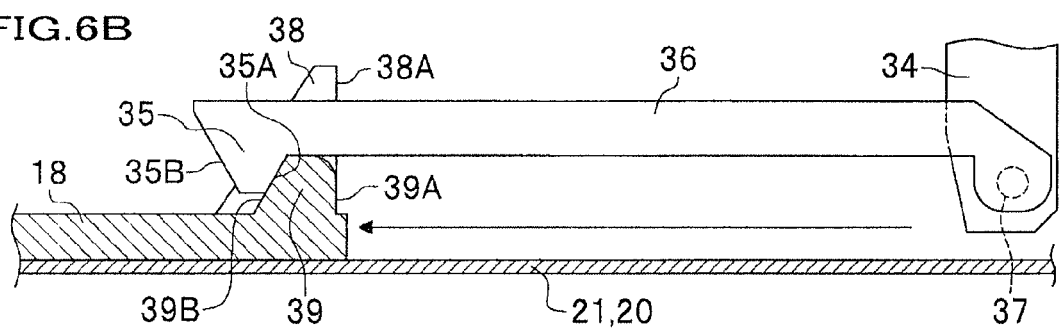
Figure 6C:
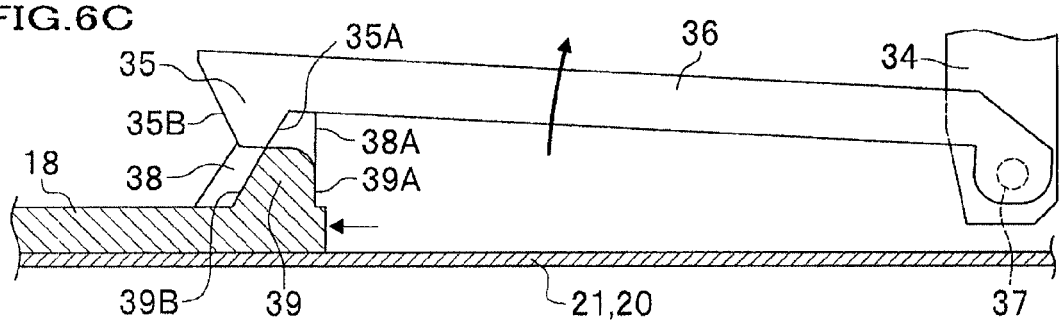
Figure 6D:
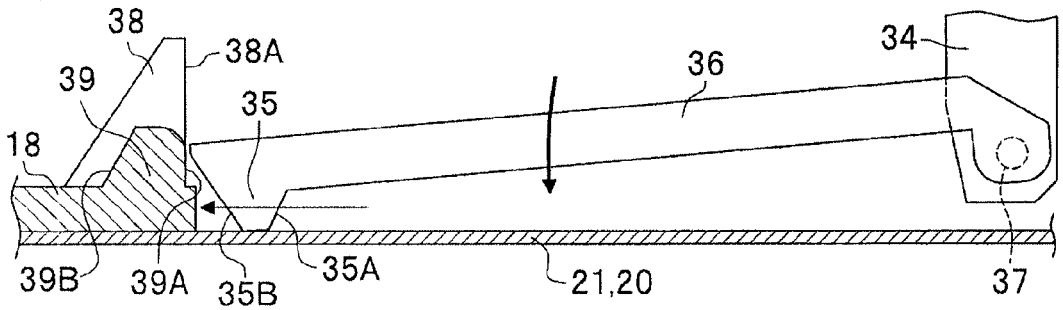

A function of the interlocking mechanism 31 at the time of manually operating in an opening direction of the sunshade panel 5 (as not shown in FIG. 6) will be described with reference to FIG. 6A to FIG. 6D. For example, a full closing condition of the roof panel 4 (as not shown in FIG. 6) is shown in FIG. 6A. As shown in FIG. 6B, the oblique engaging surface 39B of the second engaged member 39 is in contact with the front oblique surface 35A of the claw 35, when the sunshade panel 5 is manually opened from a condition in FIG. 6A. Furthermore, the front oblique surface 35A is pressed by the oblique engaging surface 39B to force the claw 35 to move upwards as shown in FIG. 6C, and then the second engaged member 39 is disengaged from the claw 35 to continue an independent movement of the sunshade panel 5 in an opening direction. Actions from FIG. 6B to FIG. 6D are performed in the same way as the case where the roof panel 4 is in an opening condition. That is, an independent movement of the sunshade panel 5 can be manually operated in an opening direction in spite of an opening or closing condition of the roof panel 4.

In a relationship between the oblique engaging surface 39B of the second engaged member 39 and the front oblique surface 35A of the claw 35, the reason why the engagement between the both is not disengaged at the time of closing the roof panel 4 during a process from FIG. 8A to FIG. 8B is based on that loads urged to the engaged spots is only an empty weight around the sunshade panel 5 made of light-weight material and the lateral force engaged between the oblique engaging surface 39B and the front oblique surface 35A is larger than the empty weight around the sunshade panel 5. On the other hand, at the time of manually operating the sunshade panel 5 in an opening direction, the roof panel 4 has an empty weight made of glass or the like and the load forced by a driving motor as not shown. Thus, when the second engaging member 36 receives a pressing force from the second engaged member 39, the second engaging member 36 is designed to rotate around a rotational axis 37 without moving rearwards and force the claw 35 to move upwards.

When the roof panel 4 is in an opening condition and the second engaged member 39 is positioned at a rear side of the claw 35, the sunshade panel 5 is naturally interlocked even in case of closing the roof panel 4. Accordingly, in the above case, when the sunshade panel 5 is manually closed and the second engaged member 39 is closed by a front position of the claw 35, it can be, thereafter, closed by interlocking with the roof panel 4.

(At the Time of Manually Operating in a Closing Direction of the Sunshade Panel 5)

Figure 6E:
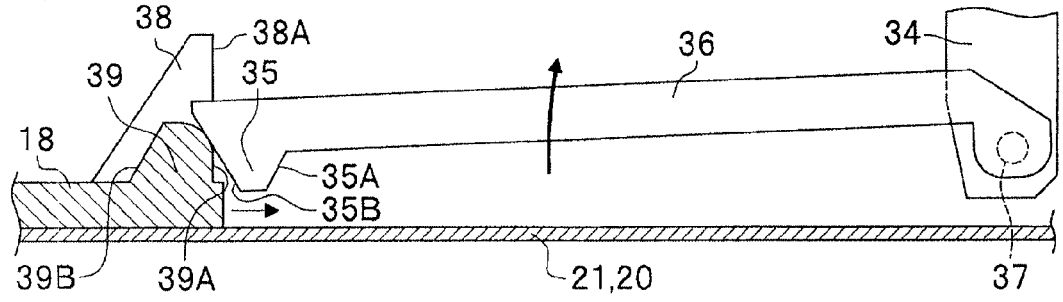

When the sunshade panel 5 is manually closed from a condition in FIG. 6D, the front surface 39A of the second engaged member 39 comes in contact with the rear oblique surface 35B of the claw 35, as shown in FIG. 6E. An upper end of the front surface 39A is processed in a shape of curved surface. Thus, on receiving the pressing force from the front surface 39A, the second engaging member 36 is designed to smoothly rotate around the rotational axis 37 to continue an independent movement of the sunshade panel 5 in a closing direction caused by pressing the claw 35 upwards. As shown in FIG. 6A, as the first engaged member 38 is in contact with the first engaging member 34, an independent movement of the sunshade panel 5 relative to the roof panel 4 in a closing direction is effectively prevented. That is, an independent movement of the sunshade panel 5 directing through the roof panel 4 in a closing condition is effectively prevented. Naturally, an independent movement of the sunshade panel 5 is prevented in any opening position of the roof panel 4. Accordingly, the sunshade panel 5 cannot be in a full closed condition with the roof panel 4 in an opening condition. Thus, a problem to forget closing the roof panel 4 can be effectively prevented.

As above mentioned, the interlocking mechanism 31 is adapted to include the engaging member 32 provided in the roof panel 4, and the engaged member 33 provided in the sunshade panel 5 and engaged with the engaging member 32. Then, when the engaging member 32 and the engaged member 33 are mutually engaged in an upper-and-lower direction such that a relative position thereof can be varied according to a change of the positional deviation of heights between the first guide rail 12 and the second guide rail 21, a function of interlocking mechanism of the sunshade panel 5 relative to the roof panel 4 can be easily obtained, even in a case where the first guide rail 12 and the second guide rail 21 are mutually different in curvature.

The engaging member 32 is constituted by the first engaging member 34 fixed to the roof panel 4, and the second engaging member 36 provided rotatably around the rotational axis 37 along a vehicle width direction to the roof panel 4 and having the claw 35 protruding in a lower side. The claw 35 is positioned in a vehicle rear side of the first engaging member 34, and the engaged member 33 is constituted by the first engaged member 38 and the second engaged member 39 protruding on an upper surface of the sunshade panel slider 18. At the time of opening the roof panel 4, the sunshade panel 5 is designed to move in an opening direction on the ground that the first engaging member 34 presses the first engaged member 38, and at the time of closing the roof panel 4, the sunshade panel 5 moves in a closing direction on the ground that the claw 35 of the second engaging member 36 is engaged (clutched) with a rear surface of the second engaged member 39. Furthermore, at the time of manually operating the sunshade panel 5 in an opening direction, an independent movement of the sunshade panel 5 in an opening direction is designed to continue on the ground that a rear surface of the second engaged member 39 forces the claw 35 to press the second engaging member 36 upwards. At the time of manually operating the sunshade panel 5 in a closing direction, an independent movement of the sunshade panel 5 in a closing direction is designed to continue on the ground that a front surface of the second engaged member 39 forces the claw 35 to press the second engaging member 36 upwards. Then, when the independent movement of the sunshade panel 5 in a closing direction is designed to prevent further movement on the ground that the first engaged member 38 is in contact with the first engaging member 34, the interlocking mechanism 31 result in a small number of parts or components thereof, a simple constitution and an excellent assembling, and thus an economical sunroof device 1 can be obtained and provided.

As above mentioned, although the sunroof device 1 having both the roof panel 4 and the sunshade panel 5 divided into a lot of pieces in a vehicle front-and-rear direction has been described, the present invention can be applied to a sunroof device having a single piece of the roof panel or sunshade panel.

What is claimed is:

1. An interlocking mechanism for a sunroof device having a roof panel and a sunshade panel, the roof panel and the sunshade panel opening or closing an opening provided in a fixed roof of a vehicle in a front-and-rear direction of the vehicle, a first guide rail guiding an opening or closing of the roof panel through a roof panel slider connected to a lower surface of a side edge of the roof panel, a second guide rail guiding an opening or closing of the sunshade panel through a sunshade panel slider provided in a side edge of the sunshade panel, comprising:

the interlocking mechanism enabling the sunshade panel to open or close by mechanically interlocking to the opening or closing of the roof panel in case of a mechanical interlocking, and in an opening direction, enabling the sunshade panel to move independently in spite of an opening or closing condition of the roof panel and in a closing direction, preventing the sunshade panel to move independently relative to the roof panel in case of the opening or closing of the sunshade panel by manual operation, wherein the interlocking mechanism comprises an engaging member provided in the roof panel, and an engaged member provided in the sunshade panel to engage with the engaging member, the engaging member including a first engaging member fixed to the roof panel and a second engaging member provided rotatably around an axis along a vehicle width direction relative to the roof panel, the engaging member and the engaged member engaging each other in an upper and lower direction such that a relative position thereof varies according to a change of positional deviation between the first guide rail and the second guide rail.

2. An interlocking mechanism for a sunroof device according to claim 1, the second engaging including a claw protruding in a lower side, wherein the claw locates at a vehicle rear portion of the first engaging member, and the engaged member is constituted by a first engaged member and a second engaged member protruding on an upper surface of the sunshade panel slider, and wherein the first engaging member presses the first engaged member to move the sunshade panel in an opening direction at the time of opening the roof panel, and the claw of the second engaging member is engaged with a rear surface of the second engaged member to move the sunshade panel in a closing direction at the time of closing the roof panel, and the sunshade panel moves independent of the roof panel in an opening direction, on the ground that a rear surface of the second engaged member presses the claw to move the second engaging member upwards at the time of manually operating the sunshade panel in an opening direction, and the sunshade panel moves independent of the roof panel in a closing direction, on the ground that a front surface of the second engaged member presses the claw to move the second engaging member upwards at the time of manually operating the sunshade panel in a closing direction, wherein the sunshade panel is prevented from moving independent of the roof panel when the first engaged member is in contact with the first engaging member.

3. An interlocking mechanism for a sunroof device according to claim 2, wherein the claw of the second engaging member is provided with a front oblique surface facing to a front and lower oblique direction thereof, and a rear surface of the second engaged member is provided with an oblique engaging surface facing to a rear and upper oblique direction thereof and engaging with the front oblique surface.

4. An interlocking mechanism for a sunroof device according to claim 3, wherein the claw of the second engaging member is provided with a rear oblique surface facing to a rear and lower oblique direction thereof, and an upper end of a front surface of the second engaged member is processed in curving surface so as to press the rear oblique surface to rotate the second engaging member smoothly.

5. An interlocking mechanism for a sunroof device having a roof panel and a sunshade panel, the roof panel and the sunshade panel opening or closing an opening defined by a fixed roof of a vehicle in a front-and-rear direction of the vehicle, a first guide rail guiding the opening or closing of the roof panel through a roof panel slider connected to a lower surface of a side edge of the roof panel, a second guide rail guiding the opening or closing of the sunshade panel through a sunshade panel slider provided in a side edge of the sunshade panel, the interlocking mechanism comprising:

an engaging member provided in the roof panel and including a first engaging member fixed to the roof panel and a second engaging member provided rotatably around an axis along a vehicle width direction relative to the roof panel; and an engaged member provided in the sunshade panel to engage with the engaging member, wherein the engaging member and the engaged member engage each other in an upper and lower direction such that a relative position thereof varies according to a change of positional deviation between the first guide rail and the second guide rail.

6. The interlocking mechanism for a sunroof device of claim 5, wherein the sunshade panel is prevented from being in a closed condition when the roof panel is in an open condition by the engaged member in contact with the first engaging member.

7. The interlocking mechanism for a sunroof device of claim 5, the second engaging including a claw protruding in a lower side, wherein the claw locates at a vehicle rear portion of the first engaging member, the engaged member including a first engaged member and a second engaged member protruding on an upper surface of the sunshade panel slider, and wherein the first engaging member presses the first engaged member to move the sunshade panel in an opening direction when the roof panel moves in the opening direction, and the claw of the second engaging member is engaged with a rear surface of the second engaged member to move the sunshade panel in a closing direction when the roof panel moves in the closing direction, and the sunshade panel moves independent of the roof panel in the opening direction when a rear surface of the second engaged member presses the claw to move the second engaging member upwards at the time of manually operating the sunshade panel in the opening direction, and the sunshade panel moves independent of the roof panel in the closing direction when a front surface of the second engaged member presses the claw to move the second engaging member upwards when manually operating the sunshade panel in the closing direction.

8. The interlocking mechanism for a sunroof device of claim 7, the claw of the second engaging member including a front oblique surface facing a front and lower oblique direction thereof, and a rear surface of the second engaged member including an oblique engaging surface facing to a rear and upper oblique direction thereof and engaging with the front oblique surface.

9. The interlocking mechanism for a sunroof device of claim 8, the claw of the second engaging member including a rear oblique surface facing a rear and lower oblique direction thereof, and an upper end of a front surface of the second engaged member including a curving surface so as to press the rear oblique surface to smoothly rotate the second engaging member.

* * * * *